United States Patent
Hsieh

[11] Patent Number: 5,832,436
[45] Date of Patent: Nov. 3, 1998

[54] SYSTEM ARCHITECTURE AND METHOD FOR LINEAR INTERPOLATION IMPLEMENTATION

[75] Inventor: Chau-kai Hsieh, Hsinchu, Taiwan

[73] Assignee: Industrial Technology Research Institute, Taipei, Taiwan

[21] Appl. No.: 838,172

[22] Filed: Apr. 16, 1997

Related U.S. Application Data

[63] Continuation of Ser. No. 989,606, Dec. 11, 1992, abandoned.

[51] Int. Cl.$^6$ .............................................. G10L 9/14
[52] U.S. Cl. ................................. 704/265; 704/262
[58] Field of Search ..................... 704/200, 265, 704/219, 207, 225, 222, 221, 264, 258, 262, 216, 263

[56] References Cited

U.S. PATENT DOCUMENTS

| | | | |
|---|---|---|---|
| 4,020,332 | 4/1977 | Crochiere et al. | 364/723 |
| 4,392,018 | 7/1983 | Fette | 395/2.74 |
| 4,419,540 | 12/1983 | Henderson | 395/2 |
| 4,577,343 | 3/1986 | Oura | 395/2.67 |
| 4,797,926 | 1/1989 | Bronson et al. | 704/214 |
| 4,833,714 | 5/1989 | Shimotoni et al. | 395/2 |
| 4,893,316 | 1/1990 | Janc et al. | 375/44 |
| 4,903,301 | 2/1990 | Kondo et al. | 395/2.25 |
| 4,985,849 | 1/1991 | Hideaki | 364/518 |
| 5,012,518 | 4/1991 | Liu et al. | 704/222 |
| 5,129,015 | 7/1992 | Allen et al. | 382/56 |

*Primary Examiner*—Richemond Dorvil
*Attorney, Agent, or Firm*—Finnegan, Henderson, Farabow, Garrett & Dunner, L.L.P.

[57] ABSTRACT

The present invention comprises an interpolation circuit for performing a linear interpolation operation for a voice synthesizer receiving a plurality of frames of voice data wherein each frame is subdivided into a plurality of sub frames with each sub frame being assigned with a predefined interpolation weighting factor. The interpolation circuit comprises an input port for receiving a plurality of sub frame voice data to be interpolated wherein said sub frame data are received in a predefined order. The interpolation circuit further includes a read-only-memory (ROM) for storing a plurality of multiplications of each of the plurality of sub frame voice data to each of the weighting factors and a read-only-memory (ROM) address generator capable of determining a address in ROM utilizing the sub frame voice data received from the input port and the predefined order of the frame and the sub frame thereof when the voice data is being received. The interpolation circuit further includes an output means for reading a multiplication from the ROM at the address and sequentially adding each of the multiplications to compute an interpolation value.

7 Claims, 2 Drawing Sheets

SYSTEM ARCHITECTURE AND METHOD FOR LINEAR INTERPOLATION IMPLEMENTATION

This application is a continuation of application Ser. No. 07/989,606, filed Dec. 11, 1992, now abandoned.

BACKGROUND OF THE INVENTION

1. Field of the Invention

This invention relates generally to speech coding. More particularly, this invention relates to a system architecture and method for implementing an interpolation algorithm for speech coding.

2. Description of the Prior Art

Since a linear interpolation technique is commonly used in voice synthesis and encoding/decoding processes, any improvement made in carrying out interpolation operations via hardware implementations will also improve the performance level of these voice processes. Specifically, a circuit architecture for implementing an interpolation algorithm which reduces the circuit complexity, increases the throughput and would find broad use among different voice synthesis and encoding/decoding applications.

In order to reduce the storage requirements and improve the transmission speed of the speech signals, various speech encoding algorithms and techniques are utilized for encoding and decoding low data rate speech parameters. One well known technique among those skilled in the art is to convert speech signals into linear predictive coding (LPC) parameters which are then converted into line spectrum pairs (LSP) data. The LSP data are then processed by a vector quantization and interpolation module for converting the LSP data into vector indexes for transmission.

In carrying out these processes, speech signals are generally digitized first by an analog to digital (A/D) converter and then divided into many frames by a frame segmenter. The LPC and LSP conversions are performed for each frame. Depending on the encoding/decoding processes used there may be step changes generated between data for adjacent frames. The step changes may adversely affect the quality of the voice reconstruction. Furthermore, in order to accelerate voice data transmission, data transmission is usually not performed for every frame which may further add to the difficulties in reconstructing a high quality voice in the receiving end. An interpolation method is therefore used to smooth-out the step changes among different frames and to better simulate real voice data for the frames for which the digitized voice data are not transmitted.

Many prior art interpolation techniques have been disclosed. In U.S. Pat. No. 4,392,018, entitled 'Speech Synthesizer with Smooth Linear Interpolation', (issued on Jul. 5,1983), Fette discloses a linear predictive coding (LPC) voice synthesizer formed as an integrated circuit (IC) on a single semiconductor chip. The circuit is designed to provide flexibility to allow variable bit rates for variable fidelity and programmable to allow for several different method for speech synthesis. The voice synthesizer also includes circuit to smoothly interpolating between sets of correlation coefficients in order to reduce the adverse effects of the voice reconstruction if there are substantial step changes between sets of correlation coefficients.

In Fette's Patent, the interpolation is performed by first determining the difference between the old or previous correlation coefficient and the new correlation coefficient and dividing that difference into a number of steps equal to the number of samples in the frame. The correlation coefficient applied to the two multipliers in the stage is then altered by that amount prior to the reconstruction of each sample. A plurality of division and multiplication operations are required. The circuit which is used to implement this interpolation algorithm is therefore quite complicated. Furthermore, the processes to be performed by the circuit are also very slow thus limit the through-put of the voice reconstruction.

Benson et al. disclose in U.S. Pat. No. 4,797,926 entitled 'Digital Speech Decoder' (issued on Jan. 10, 1989), a speech analyzer and synthesizer system which uses the sinusoidal encoding and decoding techniques for voiced frames and noise excitation or multiple pulse excitation for unvoiced frames. For each speech frame, the frame energy, speech parameters defining the vocal tract, a fundamental frequency, and offsets representing the difference between individual harmonic frequencies and integer multiples of the fundamental frequency are analyzed and encoded for speech synthesis. A linear interpolation technique is used to determine the continuous frequency and amplitude signals of the fundamental and the harmonics for the entire frame. The linear extrapolation is simpler and relatively easy to be implemented by the use of a software method. However, multiplication operations are required in a hardware implementation for linear interpolation. Bronson's technique is also limited by the more complicated circuit required to perform a linear interpolation that involves multiplication.

In U.S. Pat. No. 5,012,518, entitled 'Low Bit Rate Speech Coder Using LPC Data Reduction Processing' (issued on Apr. 30, 1991) Liu et al. disclose a speech coder which employs vector quantization of LPC parameters, interpolation, and trellis coding to improve speech coding at low bit rates of around four hundred bits per second. The speech coder has a linear predictive coding (LPC) analysis module to convert an input speech into line spectrum frequencies or generally referred to as line spectrum pair (LSP) and a vector quantization and interpolation (VQ/I) module for encoding the LSP data into vector indexes for transmission. In the interpolation module, the LSP coefficients are interpolated using an interpolation factor, i.e., f, multiplied to the coefficients of the previous frame and added to the those of the future frame which is multiplied by a complimentary factor of (1–f). Again, in order to accelerate the operation, hardware implementation of the interpolation technique is limited by the requirement that a multiplication circuit be used which usually is more complicated and occupies more space on an IC chip.

The prior art thus discloses algorithms which is generally implemented by firmware techniques. Such implementations do not provide high speed performance and are generally more expensive. For hardware implementation on an IC chip, the interpolation algorithms as disclosed in the prior art require a multiplier which is more complicated and occupies greater IC area. Therefore, a need still exists in the art of voice synthesis and encoding/decoding for an improved interpolation technique in order to overcome these limitations.

SUMMARY OF THE PRESENT INVENTION

Therefore, one object of the present invention is to teach an algorithm and the circuit implementations to perform a linear interpolation without requiring a multiplication circuit.

Another object of the present invention is to provide a circuit design to carry out the linear interpolation process with simple summation operations.

Another object of the present invention is to provide an apparatus and method for performing interpolation process without multiplication whereby the speed of data processing may be increased.

Briefly, in a preferred embodiment, the present invention comprises an interpolation circuit for performing a linear interpolation operation for a voice synthesizer receiving a plurality of frames of voice data wherein each frame being subdivided into a plurality of sub frames with each sub frame assigned a predefined interpolation weighting factor. The interpolation circuit comprises an input port for receiving a plurality of sub frame voice data to be interpolated wherein said sub frame data being received in a predefined order. The interpolation circuit further includes a read-only-memory (ROM) for storing a plurality of multiplications of each of the plurality of sub frame voice data to each of the weighting factors and a read-only-memory (ROM) address generator capable of determining an address in the ROM utilizing the sub frame voice data received from the input port and the predefined order of the frame and the sub frame thereof when the voice data is being received. The interpolation circuit further includes an output means for reading a multiplication from the ROM at the address and sequentially adding each of the multiplications to compute an interpolation value.

The architecture of the interpolation circuit as disclosed in the present invention can be used for performing a wide variety of linear interpolation operations which utilize a plurality of weighting factors. The circuit architecture can be utilized to perform the following steps:

(a). receiving a plurality of data to be interpolated in a predefined order;

(b). storing a plurality of multiplications of each of the plurality of data to each of the weighting factors in a read-only-memory (ROM);

(c). determining an address in ROM utilizing the data received and the predefined order thereof when the data is being received; and (d). reading a multiplication from the ROM at the address and sequentially adding each of the multiplications to compute an interpolation value.

One advantage of the present invention is that it provides an algorithm and the circuit implementations to perform a linear interpolation without requiring a multiplication circuit.

Another advantage of the present invention is that it provides a circuit design to carry out the linear interpolation process with simple summation operations.

Another advantage of the present invention is that it provides an apparatus and method for performing interpolation process without multiplication whereby the speed of data processing may be increased.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

In order to carry out an interpolation process, a frame which comprises a plurality of digitized speech data is usually divided into several sub frames. In Table 1, a frame is divided into four sub frames and for each sub frame a different sub frame weighting factor is applied to perform the interpolation operation. For a typical frame which is divided into four sub frames, the weighting factors of 7/8, 5/8, 3/8, and 1/8 are applied.

TABLE 1

| SUBFRAME | WEIGHTING FACTOR FOR PREVIOUS FRAME | WEIGHTING FACTOR FOR CURRENT FRAME |
| --- | --- | --- |
| 1 | 7/8 | 1/8 |
| 2 | 5/8 | 3/8 |
| 3 | 3/8 | 5/8 |
| 4 | 1/8 | 7/8 |

The speech data for each sub frame of the current frame is then computed by:

$$A(i,j)=a(i-1,j)*A(i-1,j)+a(i,j)*A(i,j) \qquad (1)$$

Where A(i,j) is the speech data of the sub frame j of the current frame i, and the a(i−1,j) is the weighting factor for sub frame j of the previous frame (i−1) and a(i,j) is the weighting factor of sub frame j of the current frame i.

Figure 1:
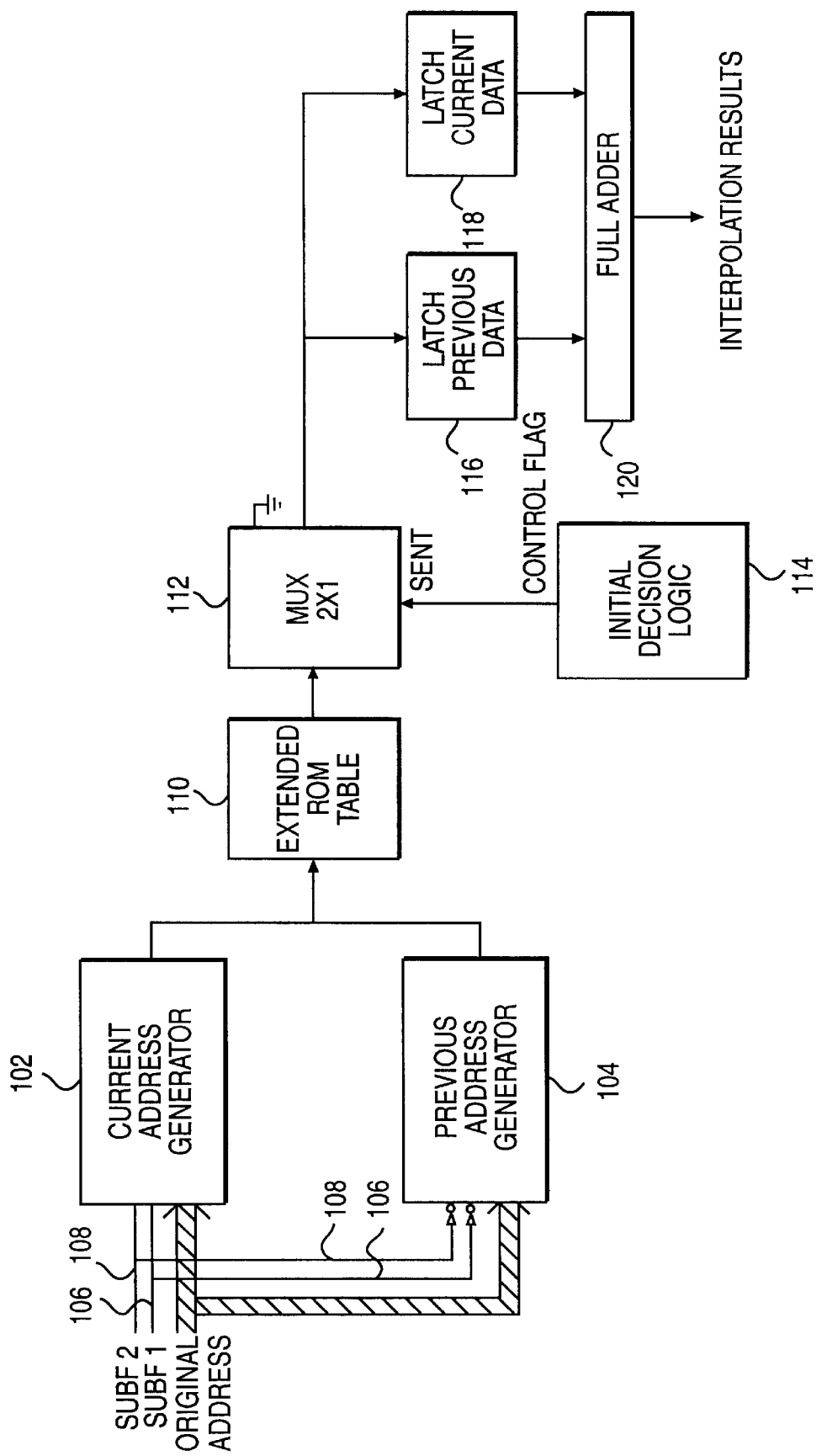
FIG. 1 shows a block diagram of an interpolation circuit for a speech coder according to the present invention.
Figure 2:
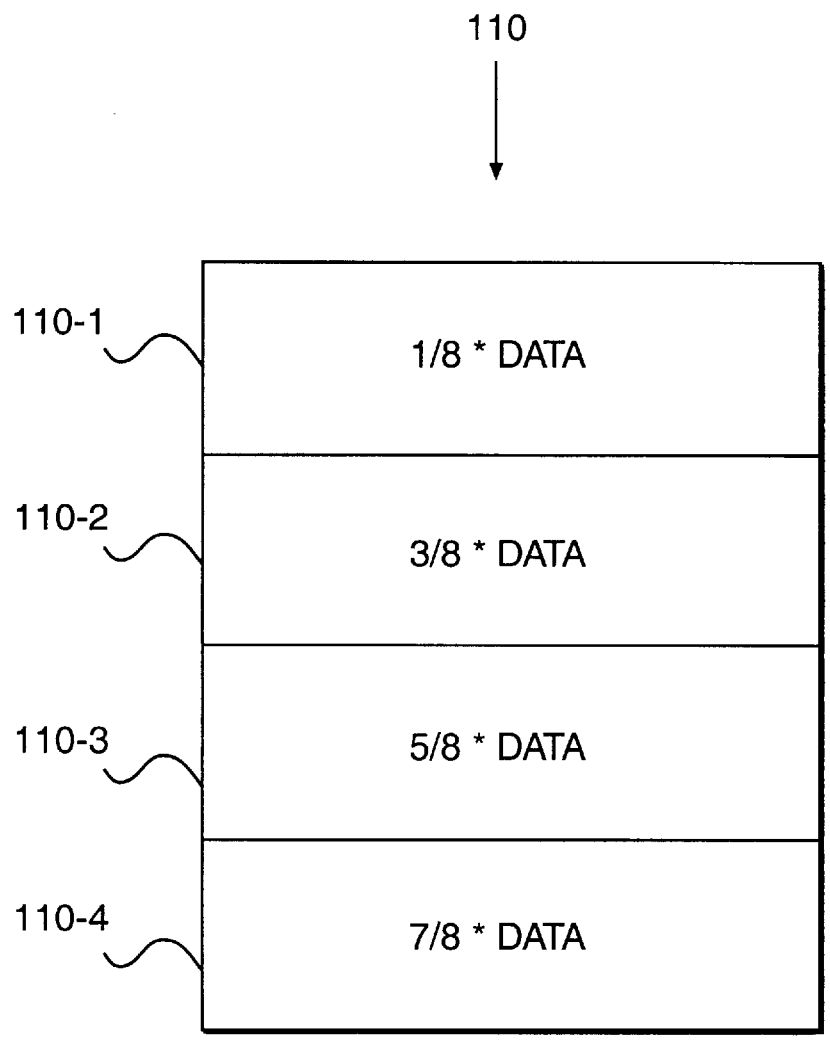
FIG. 2 illustrates an extended read only memory (ROM) for storing weighted products for carrying out the interpolation according to the present invention.

FIG. 1 shows a block diagram of an interpolation circuit 100 for a speech coder. The interpolation circuit 100 comprises a current address generator 102 and previous address generator 104. The current address generator 102 and the previous address generator 104 receive two input data, i.e., subf(1) through input line 106, and subf(2) through input line 108, for selecting the sub frame number in the current and the previous frame. For a frame which is divided into four sub frames, a two bit input sufficient. For example, if subf(1) is zero and subf(2) is one, then it represents the third sub frame. The output of the current address generator 102 and the previous address generator 104 are inputted to an extended read only memory (ROM) 110. The extended memory table contained therein is expanded four times and divided into four parts as shown in FIG. 2. A first part 110-1 comprises data one-eighth of the value of the original speech data; a second part 110-2 three-eighth; the third part 110-3 fifth-eighth; and the fourth part 110-4 eleven-eighth of the original speech data.

From Table 1, the weighting factor for each sub frame of the current frame is reflectively symmetrical to that of the previous frame, i.e., $$a(i,j)=a(i-1, N+1-j) \qquad (2)$$

Where a(i,j) is the weighting factor of sub frame j of the current frame, and a(i−1, N+1−j) is the weighting factor for the sub frame (N+1−j) of the previous frame and N is the total number of the sub frames. For an extended ROM memory 110 where N=4, an inverter can be used to generate the sub frame address of the previous frame from that of the current frame.

The data for each sub frame from the current and the previous frames as retrieved from the extended ROM 110 are temporarily latched in a current latch register 116 and a previous latch register 118 which are then received by the full adder 120 to compute the summation to perform the interpolation according to Equation (1). The interpolation circuit 100 also comprises an initial decision logic which determines if the current frame is the first frame. If the current frame is the first frame, an initial frame flag is sent to a multiplexer 112 which then sets the value of the 'previous' frame to zero.

By the use of the extended memory 110 and the sub frame address generators 102 and 104, the interpolation circuit 100 is capable of performing an interpolation process without requiring the use of a multiplication circuit. The complexity of the speech coder is greatly reduced and the total area occupied by the interpolation circuit is also reduced. By eliminating the need to perform a plurality of multiplications, a higher through-put is also achieved by the speech coder according to the present invention.

The architecture of the circuit as disclosed in this invention can be utilized in any application wherein a linear operation to be performed is in the form of:

$$R = \sum_{i=1}^{N} C(i)M(i) \quad (3)$$

Where C(i) is a set of predefined coefficients and M(i) is a measurement variable wherein the value of M(i) is one measurement among a range of predefined measurement values. An extended ROM can be used to store all combinations of C(i)M(i) which are computed externally. The data processing for calculating the value of R according to Equation (3) can therefore be simplified and accelerated without requiring multiplication.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An interpolation circuit for performing a linear interpolation operation for a voice synthesizer receiving a plurality of frames of voice data wherein each frame being subdivided into a plurality of sub frames with each sub frame assigned a predefined interpolation weighting factor, wherein the interpolation being performed in the form:

$$A(l,j) = a(l-1,j)*A(l-1,j) + a(l,j)*A(l,j)$$

where A(l,j) being the speech data of the sub frame j of the current frame l, and a(l-1,j) being the weighting factor for sub frame j of the previous frame (l-1) and a(i,j) being the weighting factor of sub frame j of the current frame l, wherein all the values of a(l-1,j)*A(l-1,j) and a(i,j)*A(i,j) being previously computed externally, said interpolation circuit comprising:

an input port for receiving a plurality of said sub frame speech data A(l-1,j) and A(i,j) in a predefined order according to the frame and sub frame indices l and j;

a read-only-memory (ROM) for storing all of said values of a(l-1,j)*A(l-1,j) and a(i,j)*A(i,j);

address generating means for generating an address in said ROM based on said sub frame speech data A(i,j) received from said input port and said predefined order of said frame and said sub frame;

means for retrieving said sub frames stored in said ROM in a predefined order; and summing means for reading said a(l-1,j)*A(l-1,j) and a(i,j)*A(i,j) retrieved from said ROM at said address and sequentially adding each of said multiplications a(l-1,j)*A(l-1,j) and a(i,j)*A(i,j) to compute an interpolation value.

2. The circuit as claimed in claim 1 wherein said retrieving means comprising a logic means and a multiplexing means.

3. A method for performing linear interpolation computations having at least a first data frame and a second data frame, comprising the steps of:

dividing each of the data frames into a plurality of sub frames;

applying a weighting factor to each of said plurality of sub frames of the first data frame;

applying a one's complement of said weighting factor to each of said plurality of sub frames of the second data frame;

generating an address for each of said weighted sub frames of the first data frame and each of said weighted sub frames of the second data frame;

storing each of said weighted sub frames in a memory;

repeating said applying through said storing steps for each of said sub frames of the first data frame and the second data frame;

retrieving said weighted sub frames from the memory in a predetermined order; and adding each of said weighted sub frames to compute a sum.

4. The method as claimed in claim 3, wherein each of the first and second data frames is divided into four sub frames.

5. The method as claimed in claim 4, wherein one of weighting factors 7/8, 5/8, 3/8, and 1/8, is applied to one of said four sub frames.

6. A linear interpolation circuit for processing at least a first data frame and a second data frame, each having a plurality of digitized data and divided into a plurality of subframes, comprising:

input means for receiving each of the data frames;

a first address means receiving the first data frame from said input means for generating a sub frame number of one of the plurality of sub frames;

a second address means receiving the second data frame from said input means for generating a sub frame number of one of the plurality of sub frames;

means for storing said sub frames and said sub frame numbers from said first address generating means and said second address generating means;

means for retrieving said selected sub from said means for storing;

a first means coupled to said retrieving means for latching said selected sub frame of the first data frame;

a second means coupled to said retrieving means for latching said selected sub frame of the second data frame; and summing means coupled to said first latching means and said second latching means for performing adding calculations of said sub frames.

7. The circuit as claimed in claim 6, wherein said retrieving means comprising a logic means and a multiplexing means, said logic means generating a first signal for said selected sub frame of the first data frame and a second signal for said selected sub frame of the second data frame.

* * * * *

UNITED STATES PATENT AND TRADEMARK OFFICE
CERTIFICATE OF CORRECTION

PATENT NO.   : 5,832,436
DATED        : November 3, 1998
INVENTOR(S)  : Chau-Kai Hsieh It is certified that error appears in the above-indentified patent and that said Letters Patent is hereby corrected as shown below:

Title page, Item [75], in the Inventor, "Chau-kai" should read --Chau-Kai--;

Title page, Item [73], in the Assignee, line 2, "Taipei" should read --Hsinchu--; and Title page, Item [57], in the Abstract, line 14, "ad address" should read --an address--.

Claim 1, column 5, line 43, "a(I-1 ,j)" should read -a(1-1,j)--

Claim 6, column 6, line 36, "subframes" should read "sub frames--.

Signed and Sealed this

Third Day of August, 1999

Attest:

Q. TODD DICKINSON

*Attesting Officer*    *Acting Commissioner of Patents and Trademarks*